(12) United States Patent
Utaka

(10) Patent No.: US 7,362,025 B2
(45) Date of Patent: Apr. 22, 2008

(54) INTERNAL PERMANENT MAGNET ROTOR HAVING IMPROVED CONFIGURATION OF MAGNETIC FLUX BARRIERS

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 379 days.

(21) Appl. No.: 11/135,452

(22) Filed: May 24, 2005

(65) Prior Publication Data

US 2005/0269888 A1  Dec. 8, 2005

(30) Foreign Application Priority Data

May 24, 2004  (JP)  ............... 2004-153549

(51) Int. Cl.
  *H02K 1/27*  (2006.01)
  *H02K 19/10*  (2006.01)
(52) U.S. Cl. ............... 310/156.57; 310/156.45; 310/156.52; 310/156.54; 310/156.83
(58) Field of Classification Search ...............
        310/156.53–156.57, 156.83, 156.45–156.54
  See application file for complete search history.

(56) References Cited

U.S. PATENT DOCUMENTS

| | | | |
|---|---|---|---|
| 5,818,139 A | 10/1998 | Yamagiwa et al. | |
| 6,121,706 A * | 9/2000 | Nashiki et al. | 310/168 |
| 6,803,692 B2 | 10/2004 | Hattori et al. | |
| 6,836,045 B2 | 12/2004 | Murakami et al. | |
| 6,946,766 B2 * | 9/2005 | Gary et al. | 310/156.53 |
| 2006/0119203 A1 * | 6/2006 | Brown et al. | 310/156.53 |
| 2006/0145556 A1 * | 7/2006 | Aota et al. | 310/156.53 |

FOREIGN PATENT DOCUMENTS

| | | | |
|---|---|---|---|
| JP | A 2000-60038 | | 2/2000 |
| JP | 2000245087 A | * | 9/2000 |
| JP | A 2001-339922 | | 12/2001 |
| JP | A 2002-44920 | | 2/2002 |
| JP | A 2003-324875 | | 11/2003 |
| WO | WO96/03793 | | 2/1996 |

OTHER PUBLICATIONS

Oct. 30, 2007 Japanese Office Action with English translation of Notification of Reasons for Rejection.

* cited by examiner

*Primary Examiner*—Tran Nguyen
(74) *Attorney, Agent, or Firm*—Oliff & Berridge, PLC

(57) ABSTRACT

At each permanent magnet in a rotor of an IPM rotary electric machine, each of a pair of flux barriers respectively disposed adjoining circumferentially opposed side faces of the magnet is formed with a trench portion that extends farther from a circumferential face of the rotor than a position on a corresponding side face that is located farthest, on that side face, from the rotor circumferential face. This prevents part of a flow of magnetic flux, from the stator through the rotor, from being diverted to flow into the magnet. Increased torque or output power is thereby achieved.

7 Claims, 6 Drawing Sheets

INTERNAL PERMANENT MAGNET ROTOR HAVING IMPROVED CONFIGURATION OF MAGNETIC FLUX BARRIERS

This application is based on and incorporates herein by reference Japanese Patent Application No. 2004-153549 filed on May 24, 2004.

BACKGROUND OF INVENTION

1. Field of Application

The present invention relates to a rotor of an internal permanent magnet (hereinafter abbreviated to IPM) type of rotary electric machine, and in particular to a rotor of an IPM rotary electric machine in which magnetic flux barriers are disposed circumferentially adjacent to each of respective permanent magnets that are implanted within the rotor, for blocking a flow of magnetic flux from each permanent magnet.

2. Description of Prior Art

IPM rotary electric machines are well known in the prior art, with such a rotary electric machine having a plurality of permanent magnets implanted within the rotor rather than being mounted at the rotor surface. Such a type of rotary electric machine has various advantages over machines in which permanent magnets are mounted at the rotor surface, such as increased rotor strength and resistance to the effects of centrifugal force on the rotor. In addition, (when the rotary electric machine is operated as a motor) the motive torque that is developed by the rotor is made up of not only magnetic torque resulting from the flow of magnetic flux of the permanent magnets of the rotor, but also of reluctance torque that results from differences in magnetic resistance between respective circumferential portions of the rotor.

An example of a rotor for a prior art IPM rotary electric machine has been proposed in Japanese patent publication number 2000-60038 (referred to in the following as reference document 1). With that IPM rotary electric machine, two permanent magnets are utilized to constitute one pole of the rotary electric machine. The two permanent magnets are configured in a V-shape, which opens towards the outer circumferential periphery of the rotor. With such a configuration, the q-axis (quadrature axis) inductance (Lq) of the rotor is greater than its d-axis (direct axis) inductance (Ld) and as a result, the angular position of the rotor can be accurately detected based on variations in inductance.

Another example of a rotor for a prior art IPM rotary electric machine has been proposed in Japanese patent publication number 2001-339922 (referred to in the following as reference document 2). With that IPM rotary electric machine, permanent magnets are disposed in the rotor in the same manner as described in reference document 1. However in addition, a magnetic flux barrier (referred to in the following simply as a flux barrier) is disposed between each pair of permanent magnets, to thereby increase the reluctance torque.

Another example of a rotor for a prior art IPM rotary electric machine has been proposed in Japanese patent publication number 2002-44920 (referred to in the following as reference document 3). With that IPM rotary electric machine, which operates as a synchronous reluctance motor (i.e., a type of motor which does not normally incorporate permanent magnets, in the prior art) implanted permanent magnets are enclosed by flux barriers, to thereby provide a synchronous AC motor that utilizes both reluctance torque and magnetic torque.

Another example of a rotor for a prior art IPM rotary electric machine has been proposed in Japanese patent publication number 2003-324875 (referred to in the following as reference document 4). That IPM rotary electric machine is a motor that utilizes reluctance torque, wherein noise and vibration produced by the motor are reduced by employing specially shaped flux barriers.

Such prior art types of IPM rotary electric machine utilize permanent magnets that are formed of expensive materials such as rare earths, thereby increasing the manufacturing costs of such machines. It would be preferable to increase the level of reluctance torque that is developed in such a rotary electric machine, so that less expensive permanent magnets (i.e., producing lower levels of magnetic flux) could be utilized to thereby reduce the manufacturing cost, while maintaining a sufficiently high level of total torque that is a combination of the reluctance torque and magnetic torque.

In addition, such prior art types of IPM rotary electric machine have various disadvantages, as described in the following In the case of the rotary electric machines proposed in reference documents 1 and 2, two permanent magnets are utilized to form each pole of the rotary electric machine, so that the manufacturing operations to produce the rotor of such a machine are complex, and the total cost of the permanent magnets used in each machine is increased by comparison with that of a usual type of IPM rotary electric machine.

In the case of the rotary electric machine proposed in reference document 3, the torque is increased by comparison with a usual synchronous reluctance motor. However due to the fact that priority is given to increasing the flow of the q-axis magnetic flux, the shape of each permanent magnet (and hence, the shape of each of the magnet accommodation cavities within which the permanent magnets are respectively implanted) is determined by the shapes of the flux barriers, so that it is not possible to achieve a sufficient degree of magnetic torque.

In the case of the rotary electric machine proposed in reference document 4, in which the flux barriers are configured such as to reduce the level of vibration and noise produced by the rotary electric machine, no description is provided of a flux barrier configuration which would enable an increase in the output power produced by the rotary electric machine.

It would be highly advantageous to be able to increase the level of output power produced by an IPM rotary electric machine (i.e., level of electrical power output in the case of an electrical generator, or level of output shaft power, in the case of a motor), without increasing the size of the rotor, without increasing the number or size of permanent magnets that are installed in the rotor, and without increasing the manufacturing cost. However these advantages cannot be provided by prior art types of IPM rotary electric machine such as those described above. In particular, these prior art proposals do not describe any simple way (e.g., by altering the shape of the rotor) of increasing the level of output power at which output power saturation begins to occur, when an IPM rotary electric machine is operating at a high speed of rotation.

One factor which reduces the level of output torque or output power that can be obtained with a prior art type of IPM rotary electric machine is illustrated in FIG. 15, described in greater detail hereinafter. With such a prior art configuration, when q-axis magnetic flux passes from the stator into the rotor and flows between circumferentially adjacent flux barriers and then along a circumferential path below an implanted permanent magnet 12, a part of the q-axis magnetic flux will flow through a region closely adjacent to the radially inward face of the permanent magnet 12, i.e., after passing through the region indicated by the circle 2. As a result, some of the q-axis magnetic flux will be diverted, to flow into the permanent magnet 12, and this results in decreases in the level of available torque or output power, and a more rapid onset of output saturation, as the torque or output power level is increased.

SUMMARY OF THE INVENTION

It is an objective of the present invention to overcome the above problems of the prior art, by providing an IPM rotary electric machine having a rotor configuration whereby a level of q-axis magnetic flux flow within the rotor core can be increased by comparison with the prior art.

To achieve the above objectives, according to a first aspect the invention provides an (IPM) rotary electric machine having a rotor with a rotor core formed with a plurality of magnet accommodation cavities disposed successively circumferentially with a fixed pitch and with a plurality of permanent magnets contained within respective magnet accommodation cavities, each magnet accommodation cavity having circumferentially opposing faces respectively extending parallel to an axial direction of the rotor. Each magnet accommodation cavity is located inward from a circumferential face of the rotor core, i.e., a circumferential face that is located opposite the stator of the rotary electric machine. The rotor core further includes a plurality of flux barriers configured as respective cavities, for blocking passage of a circumferential flow of magnetic flux of the permanent magnets, with a pair of these flux barriers disposed extending out of, or closely adjacent to, respective circumferentially opposing ends of each magnet accommodation cavity. Each flux barrier extends radially to a position close to the aforementioned circumferential face of the rotor core. The rotor of an IPM rotary electric machine according to the present invention is characterized in that each of these flux barriers is formed with a trench portion which extends to a deepest point (of the flux barrier) within the rotor core, specifically, a point located at a greater radial distance from the aforementioned circumferential face of the rotor than a radial distance from that circumferential face to a deepest edge of a corresponding side face of the permanent magnet. Here, "deepest edge of a side face" signifies a location, on that side face, which is at a maximum radial distance from the circumferential face of the rotor.

As a result of such a configuration of the circumferentially disposed flux barriers of the permanent magnet it can be ensured that when q-axis magnetic flux flows from the stator into the rotor core and then passes through the rotor core along path below a permanent magnet, before returning to the circumferential face of the rotor core, the q-axis magnetic flux flow is effectively prevented from being diverted by flowing into the permanent magnet. It can thereby be ensured that, when for example the IPM rotary electric machine is operated as an electrical generator, a higher level of output power can be achieved under a condition of high-speed rotation than has been possible in the prior art, without requiring an increase in the number of permanent magnets installed in the rotor, or the use of more expensive permanent magnets that produce a higher level of magnetic flux. In addition, this result is achieved without requiring any increased complexity in configuration of the rotor, so that increased manufacturing cost is avoided.

According to another aspect, such an IPM rotary electric machine has each of the aforementioned circumferentially disposed flux barriers shaped substantially as a triangle, as seen in a cross-section taken in a plane at right angles to the rotor axis direction. The triangle has:

(a) a first apex, corresponding to the aforementioned deepest edge of the corresponding side face of the corresponding permanent magnet, (b) a second apex that corresponds to the aforementioned deepest point of the trench portion, and (c) a third apex that is a point of intersection between an outer side face of the flux barrier and a tangent line that extends from the deepest edge of the corresponding side face of the corresponding permanent magnet, and is tangent to an imaginary circle that is centered on a central axis of the rotor and has a radius equal to the distance from the central axis to the deepest edge.

With such a configuration of each circumferential flux barrier, in addition to the amount of q-axis magnetic flux that is diverted to each permanent magnet being reduced as described above, the length of path along which q-axis magnetic flux flows within the rotor before returning to the stator can be reduced, so that an increase can be achieved in the maximum level of power produced before the onset of saturation.

Preferably, with such a configuration of each circumferential flux barrier, designating;

(a) Ld0 as the value of d-axis inductance (Ld) of the rotor that is obtained when there is no difference between the distance of the second apex (i.e., deepest point of the trench portion) from the aforementioned circumferential face of the rotor and the distance of the first apex (i.e., deepest edge of the side face of the permanent magnet) from that circumferential face, and (b) Ldim as a value of the difference between these respective distances whereby a minimum value of the d-axis inductance (Ld) is obtained, the difference between the respective distances is established such that the d-axis inductance (Ld) attains a value within a range from 0.5(Ld0+Ldmin} to Ldmin.

Furthermore preferably with such a configuration of each circumferentially disposed flux barrier, the aforementioned triangle cross-section is configured such that a straight line extending between the second apex and the third apex is longer than a straight line constituting a base line of the triangle, extending between the second apex and the first apex. In that way, the deepest point of the trench portion is located circumferentially closer to the magnet accommodation cavity than the aforementioned point of intersection between the outer side face of the flux barrier and the tangent line.

Moreover preferably with such a configuration of each circumferentially disposed flux barrier, a ratio of the length of the straight line extending between the second apex and the third apex to the length of the straight line extending between the second apex and the first apex has a value within a range from 1 to 2.

In addition, with such a configuration of each circumferentially disposed flux barrier, a ratio of the length of a line extending at right angles from the second apex to the base line to the length of the aforementioned base line of the triangle is preferably within a range of 0.3 to 0.8.

Preferably, each of the aforementioned trench portions is configured to extend out of the corresponding flux barrier. However alternatively, each trench portion can be configured as a cavity disposed adjacent to the corresponding one of the flux barriers, but separated therefrom by a thin partition, or partially separated therefrom by a partial partition.

DESCRIPTION OF PREFERRED EMBODIMENTS

Embodiments of a rotor for an IPM rotary electric machine according to the present invention will be described in the following. It should be noted that the scope claimed for the invention, as set out in the appended claims, is not limited to these embodiments, and that it would be possible to combine the concepts of these embodiments with other known technical features to produce a rotor for an IPM rotary electric machine that would be within the scope of the invention.

First Embodiment

Figure 1:
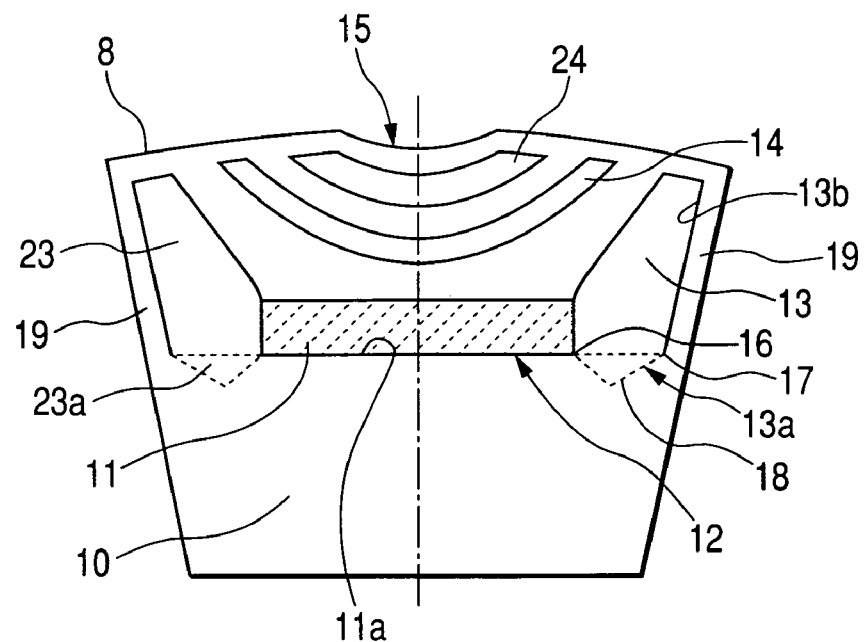
FIG. 1 is a partial cross-sectional view of a rotor of an embodiment of an IPM rotary electric machine, taken in a plane at right angles to the rotor axis direction, showing an implanted permanent magnet and corresponding adjoining circumferentially opposed flux barriers.
Figure 2:
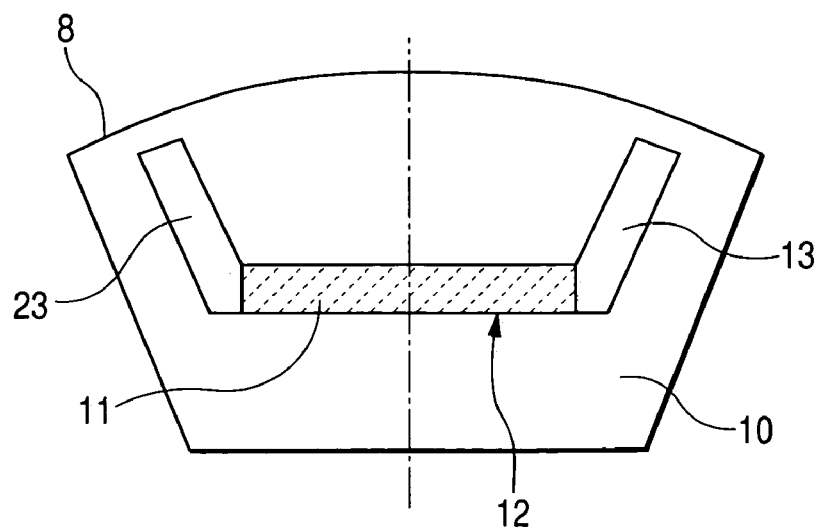
FIG. 2 is a partial cross-sectional view of a rotor of an example of a prior art IPM rotary electric machine.

A first embodiment of a rotor for an IPM rotary electric machine is shown in FIG. 1, which is a partial cross-sectional view perpendicular to the direction of the rotor axis. This shows a portion of the rotor corresponding to one pole pitch, and in particular shows one of a plurality of implanted permanent magnets of the rotor. In FIG. 1, numeral 10 denotes the rotor core, which is formed of stacked laminations of magnetic material, numeral 11 denotes a magnet accommodation cavity having a permanent magnet 12 contained therein, with the magnet accommodation cavity 11 and permanent magnet 12 each being of oblong rectangular shape. Numerals 13 and 23 denote two flux barriers that are located respectively extending circumferentially from opposing sides of the magnet accommodation cavity 11, in the clockwise direction and in the anti-clockwise direction respectively. Numerals 14, 24 denote flux barriers, in the form of lens-shaped slits having radially opposed faces that are arc-shaped in cross-section as shown in FIG. 1, referred to in the following as slots 14 and 24 respectively, which function as barriers to obstruct a flow of d-axis magnetic flux. Numeral 15 denotes a concave region that is formed in the circumferential face of the rotor core 10, referred to in the following as the cut-out region 15.

The rotor may include other flux barriers which communicate with the flux barriers 13 and 23, e.g., axially opposing flux barriers disposed adjacent to each permanent magnet, however the present invention relates only to flux barriers that are disposed at circumferentially opposing sides of each permanent magnets.

Each of the magnet accommodation cavity 11, the flux barriers 13, 23, and the slits 14, 24 are formed by stamping out appropriately shaped apertures in successive ones of the stacked laminations that form the rotor core 10.

As is well known, such an IPM rotary electric machine has an even number of permanent magnets such as the permanent magnet 12, of circumferentially alternating polarity, each disposed at an identical depth below a circumferential face 8 of the rotor core 10 that is located opposite the stator of the rotary electric machine, with the upper and lower (i.e., with respect to the radial direction) faces of each permanent magnet extending parallel to the axial direction of the rotor. The permanent magnet 12 is magnetized in its thickness direction, i.e., with the N and S poles being at the upper/lower sides (or lower/upper sides) respectively, as seen in FIG. 1. Such an IPM rotary electric machine may be used for example as a brushless DC motor, or a synchronous rotary electric machine. Since the concepts of IPM rotary electric machines are well known, detailed description of these will be omitted in the following. Each of the flux barriers 13 and 23 is formed as an elongated cavity having an axis which extends in approximately a radial direction (i.e., approximately within a range of ±30° with respect to a radial direction). The flux barriers 13 and 23 respectively extend circumferentially out of opposing circumferential ends of the magnet accommodation cavity 11, and each extends radially to a position adjacent to the circumferential face 8 of the rotor core 10.

The flux barriers 13 and 23, in combination, assist in preventing a flow of magnetic flux produced by the permanent magnet 12 from being "short-circuited" by flowing through regions of the rotor core 10 that are close to the permanent magnet 12.

The aforementioned concave lens-shaped slits 14, 24 are disposed close to the circumferential face of the rotor core 10, and serve to guide and enable a flow of q-axis magnetic flux that passes from the stator into the rotor and returns to the stator, while obstructing a flow of d-axis magnetic flux (produced by permanent magnets such as the permanent magnet 12) so that the d-axis inductance (Ld) of the rotary electric machine is made small and the q-axis inductance (Lq) is made large. It would be possible to use different numbers of such slits, or to alter the shapes of these, as is well known.

The cut-out portion 15 formed in the circumferential face of the rotor core 10 has similar effects to those of the slits 14, 24.

The following description will be directed mainly to the flux barrier 13, but is to be understood as applying equally to the flux barrier 23 and to each of other identical pairs of flux barriers that are similarly disposed circumferentially adjoining each of the other permanent magnets of the rotor core 10, which are not shown in the drawings.

With the present invention, the flux barrier 13 is formed with a radially inward-extending trench portion 13a (i.e., extending in a direction generally oriented away from the circumferential face of the rotor core 10), that is concave in cross-section, and is located at the radially opposite end of the flux barrier 13 to the end that is disposed adjacent to the circumferential face 8 of the rotor core 10. In the cross-sectional view of FIG. 1, numeral 16 denotes a point corresponding to a lower edge of a side face of the magnet accommodation cavity 11 (specifically the position, on that side face, which is farthest from the circumferential face of the rotor core 10). That position on the magnet accommodation cavity 11 will be referred to in the following as the "side face deepest edge 16", in the following description. Similarly, numeral 17 denotes a location which, for simplicity of description in the following when describing embodiments that utilize permanent magnets of rectangular shape, will be indicated as the point of intersection between the outer side 13b of the flux barrier 13 (i.e., the side which is spaced apart circumferentially from the permanent magnet 12) and a reference line that extends from the radially inward face of the magnet accommodation cavity 11, and will be referred to as the side intersection point. However a preferred manner of defining the configuration of the trench portion 13a, that is applicable to various shapes of permanent magnet, will be described in the following for the case of a non-rectangular magnetic shape.

Figure 9:
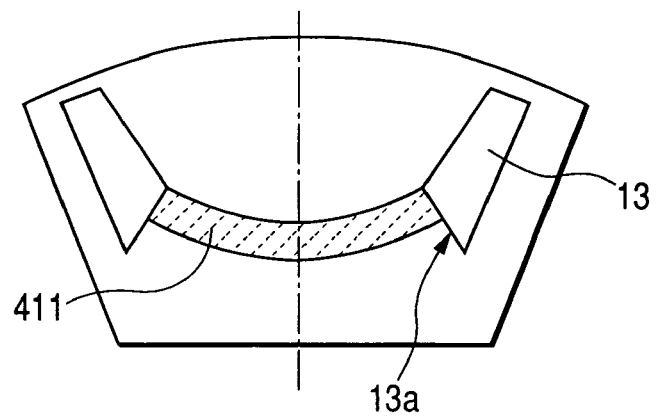
FIG. 9 is a partial cross-sectional view of a rotor having implanted permanent magnets that are of curved cross-sectional shape.
Figure 14:
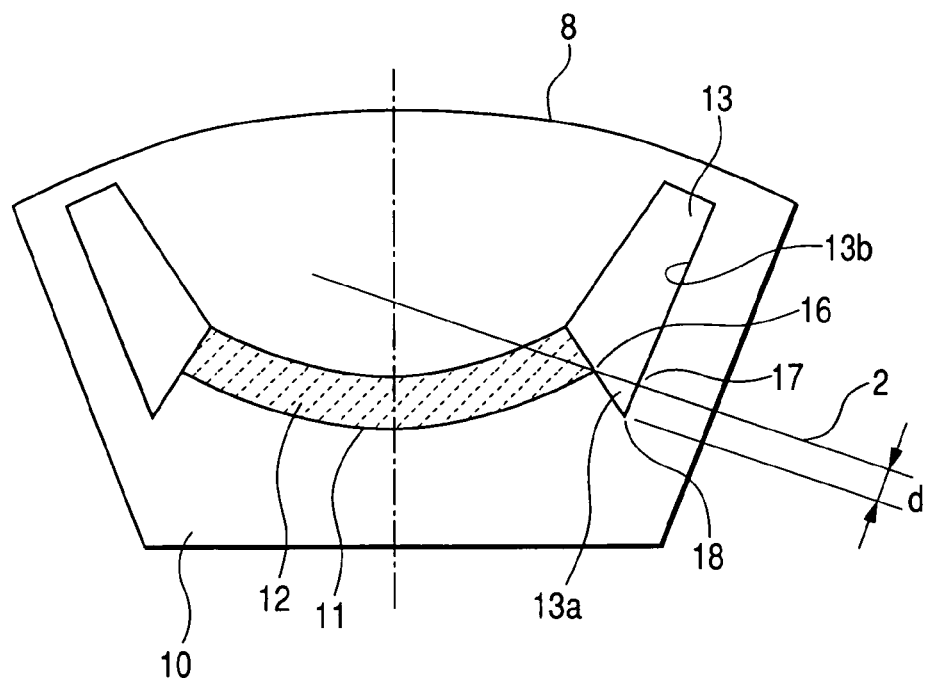
FIG. 14 is a partial cross-sectional view corresponding to FIG. 9, for use in defining nomenclature used herein to describe the cross-sectional configuration of each trench portion of respective flux barriers.

Referring to FIG. 9, a partial cross-sectional view of a rotor is shown, in which each permanent magnet 12 is formed with two circumferentially opposing axially extending faces which are arc-shaped in cross-section. This is shown in enlarged view in FIG. 14, in which numeral 2 denotes a line that passes through the side face deepest edge 16 and is tangent to an imaginary circle centered on the rotor axis and having a radius equal to the distance from the rotor axis to the side face deepest edge 16. The side intersection point 17 is defined as the point of intersection between the tangent 2 and the outer side face 13b of the flux barrier 13. The difference between the radial distance of the deepest point 18 of the trench portion 13a from the circumferential face 8 of the rotor core 10 and the radial distance of the side face deepest edge 16 from the circumferential face 8 will be referred to as the depth d of the trench portion 13a.

With the embodiment shown in FIG. 1, the cross-sectional shape of the trench portion 13a is triangular, with a first apex at the side face deepest edge 16, a second apex at the deepest point 18, and the third apex being the side intersection point 17, with a line connecting the points 16 and 17 constituting a base line of the triangle.

The side face of the trench portion 13a that corresponds to the line connecting the side face deepest edge 16 to the deepest point 18 of the trench portion 13a will be referred to as the inner sloping face of the trench portion 13a in the following, while the side face of the trench portion 13a that corresponds to the line connecting the side intersection point 17 to the deepest point 18 will be referred to as the outer sloping face of the trench portion 13a.

The flow of magnetic flux with this embodiment will be described in the following, referring to FIG. 1 and to FIG. 13, which shows the cross-sectional view of FIG. 1 in simplified form, with the slits 14, 24 omitted. A d-axis (direct axis) magnetic flux flows in a circumferential direction between two adjacent permanent magnets which are each of the form of the permanent magnet 12, as for a prior art type of rotor. Part of the q-axis magnetic flux flows from the stator, along an outer circumferential magnetic path (not shown in the drawings) within the rotor core 10, passing from the circumferential face 8 of the rotor core 10, between the slit 14 and the radially outward face of the permanent magnet 12, and also between the slits 14 and 24, and between the slit 24 and the cut-out portion 15, and then back to the stator. Another part of the q-axis magnetic flux (referred to in the following as the inner-side q-axis magnetic flux, indicated by full-line arrow lines in FIG. 13) flows from the stator along an inner circumferential path. This magnetic flux passes from the stator into the rotor 10 between the flux barrier 13 and an adjacent flux barrier 23 (not shown in the drawings, i.e., that is located to the clockwise side of the flux barrier 13 as seen in FIG. 1) then flows circumferentially through the rotor core 10 along a path located radially inward from the lower face of the permanent magnet 12, and then passes radially outward between the flux barrier 23 and an adjacent flux barrier 13 (not shown in the drawings, i.e., that is located to the left side of the flux barrier 23 as seen in FIG. 1) to return to the circumferential face 8 of the rotor core 10 and hence back to the stator.

The inner circumferential path of flux flow will be referred to in the following as the flux path 19. The actual form of the flux path 19 is determined by the configuration of the trench portion 13a.

Figure 13:
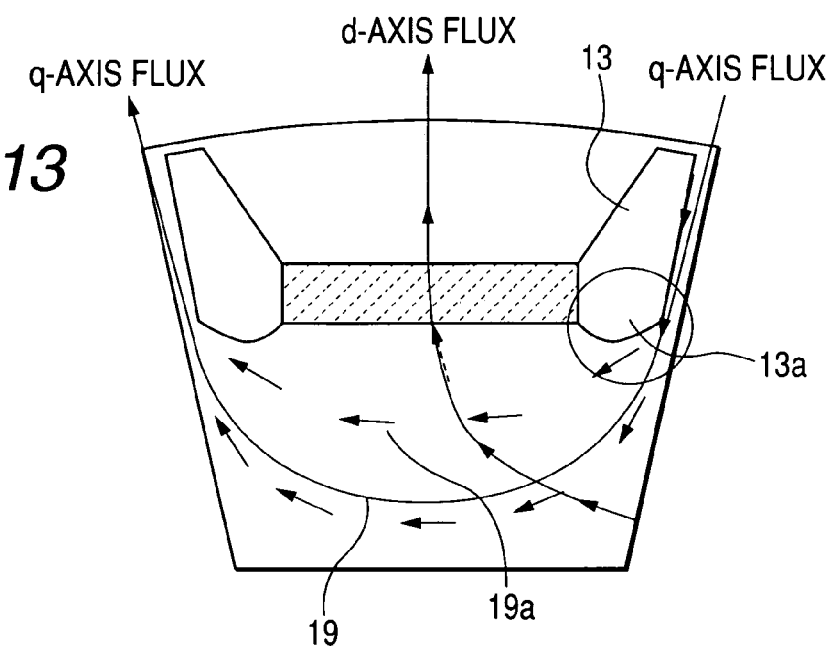
FIG. 13 is a conceptual partial cross-sectional view of a rotor of an IPM rotary electric machine according to the present invention, for illustrating the effects of flux barrier trench portion configuration upon a flow path of q-axis magnetic flux within the rotor core.
Figure 15:
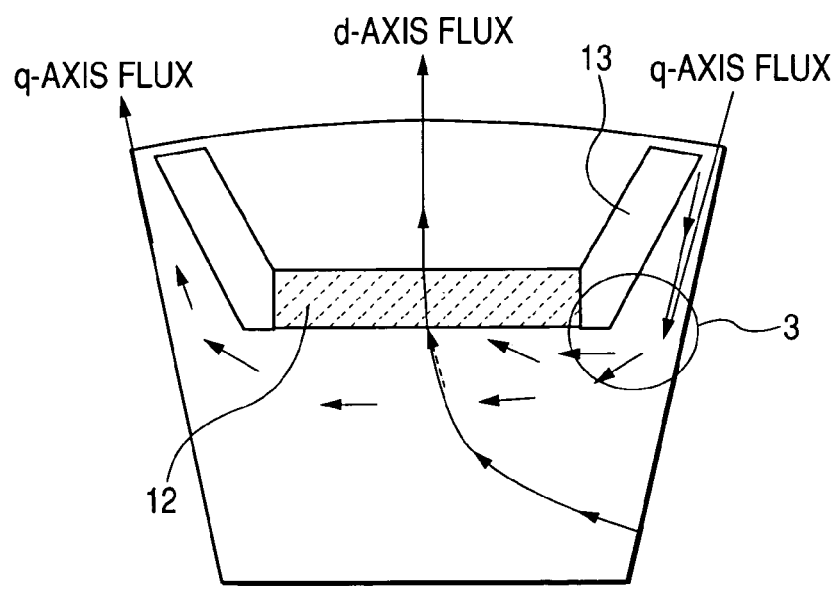
FIG. 15 is a conceptual partial cross-sectional view of an example of a rotor of a prior art IPM rotary electric machine, for use in describing disadvantages of the prior art.

As illustrated in FIG. 13, due to the configuration of the trench portion 13a of the flux barrier 13, the q-axis magnetic flux that flows along the flux path 19 is effectively prevented from passing closely adjacent to the radially inward face of the permanent magnet 12, so that the disadvantage of the prior art described above referring to FIG. 15 is effectively overcome.

Figure 3:
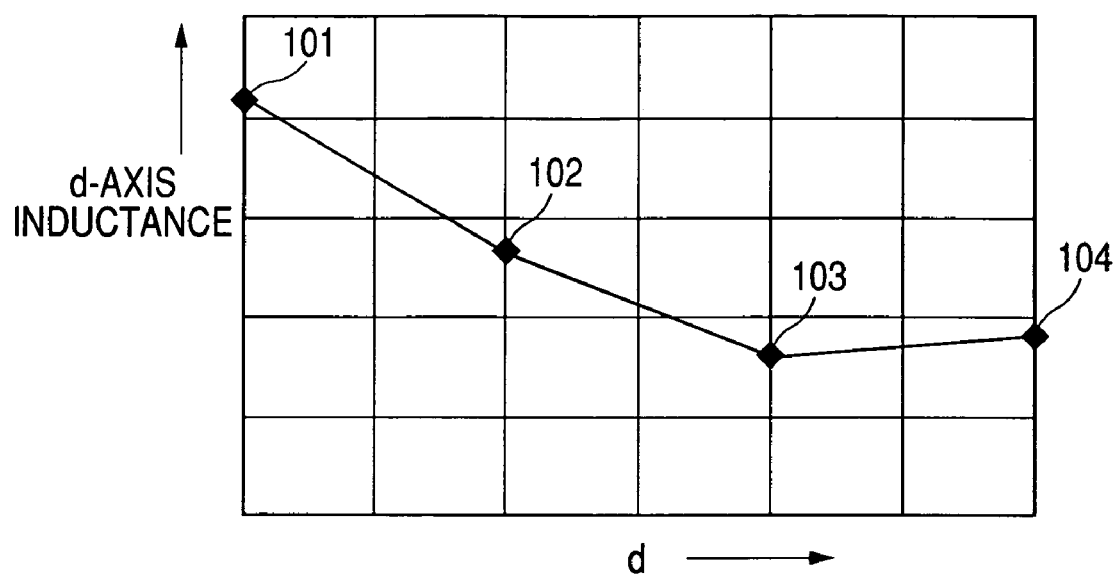
FIG. 3 is a graph showing a relationship between a value of depth of each trench portion of respective flux barriers in an IPM rotary electric machine according to the present invention and a level of d-axis inductance (Ld) of the rotor.
Figure 4:
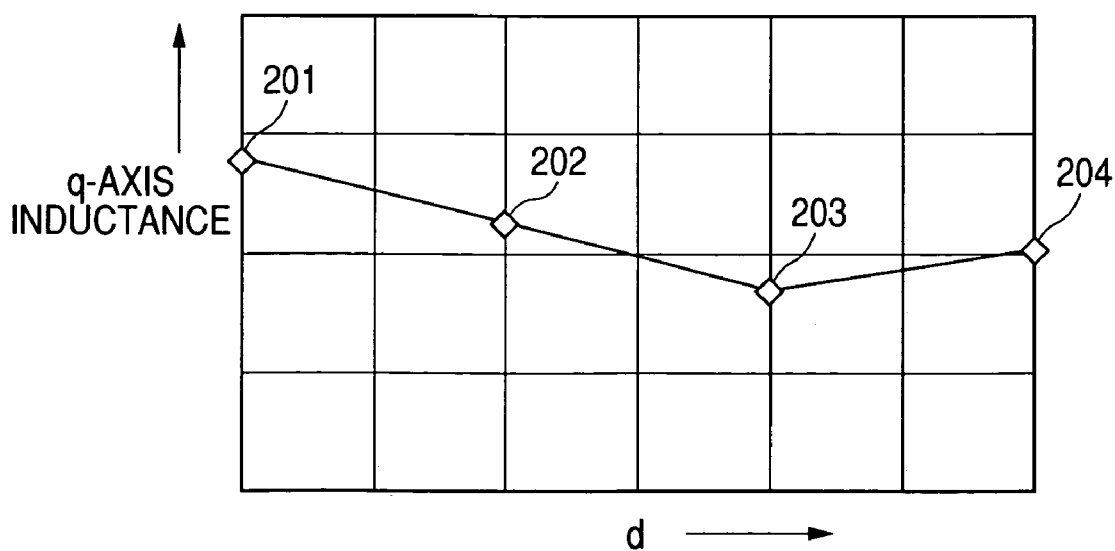
FIG. 4 is a graph showing a relationship between a value of depth of respective flux barriers in an IPM rotary electric machine according to the present invention and a level of q-axis inductance (Lq) of the rotor.
Figure 5:
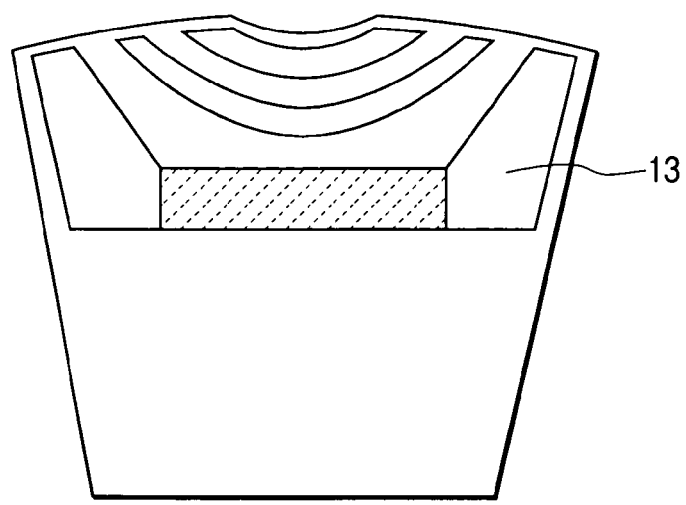
FIG. 5 is a partial cross-sectional view of a rotor, for which corresponding information is expressed in FIGS. 3 and 4, having a most shallow depth of each trench portion of respective flux barriers, in an IPM rotary electric machine according to the present invention.

The operation of such a rotor will be further described referring to the cross-sectional views of FIGS. 5 to 8 which show respectively different configurations of the trench portion 13a in a flux barrier 13, in conjunction with the graphs of FIGS. 3 and 4. In FIGS. 3 and 4, the results of calculations of q-axis inductance (Lq) and d-axis (direct axis) inductance (Ld) are shown for various different value of the depth d of the trench portion 13a of the flux barrier 13. Specifically, FIG. 3 shows the relationship between variation of the depth d and the d-axis inductance (Ld), while FIG. 4 shows the relationship between variation of the depth d and the q-axis inductance (Lq).

In FIG. 3, the graph points 101, 102, 103, 104 correspond to values of q-axis inductance (Lq) that are obtained for the case of forming the trench portion 13a of the flux barrier 13 as shown in FIG. 5, FIG. 6, FIG. 7 and FIG. 8, respectively. Similarly in FIG. 4, the graph points 201, 202, 203, 204 correspond to values of d-axis inductance (Ld) that are obtained for the case of forming the trench portion 13a as shown in FIG. 5, FIG. 6, FIG. 7 and FIG. 8, respectively.

As shown in FIGS. 3 and 4, both the d-axis inductance (Ld) and the q-axis inductance (Lq) successively decrease as the depth d of the trench portion 13a is increased from a minimum value (corresponding to the configuration shown in FIG. 5) until a minimum point is reached, then both of the d-axis inductance (Ld) and q-axis inductance (Lq) begin to increase as the depth d is further increased.

It can be understood from FIGS. 3 and 4 that the amount of reduction that can be achieved in this way is greater for the case of the d-axis inductance (Ld) than for the q-axis inductance (Lq).

When an IPM rotary electric machine is operated at a high speed of rotation, for example as an electrical generator, the level of output power that is generated varies inversely with the d-axis inductance (Ld). Hence, if the depth d of the trench portion 13a is set such that the d-axis inductance (Ld) is within a range of small values, the performance of the rotary electric machine under high-speed rotation operation can be enhanced. Preferably, the trench portion 13a should be formed with a shape and depth as illustrated in FIG. 6 or FIG. 7, so that the level of d-axis inductance (Ld) approximately corresponds to the point 103 in FIG. 3.

Figure 6:
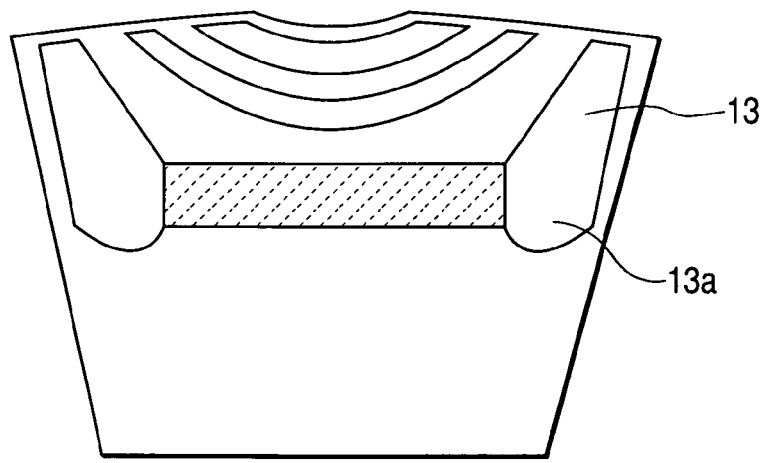
FIG. 6 is a partial cross-sectional view of a rotor, for which corresponding information is expressed in FIGS. 3 and 4, having a second most shallow depth of each trench portion of respective flux barriers.
Figure 7:
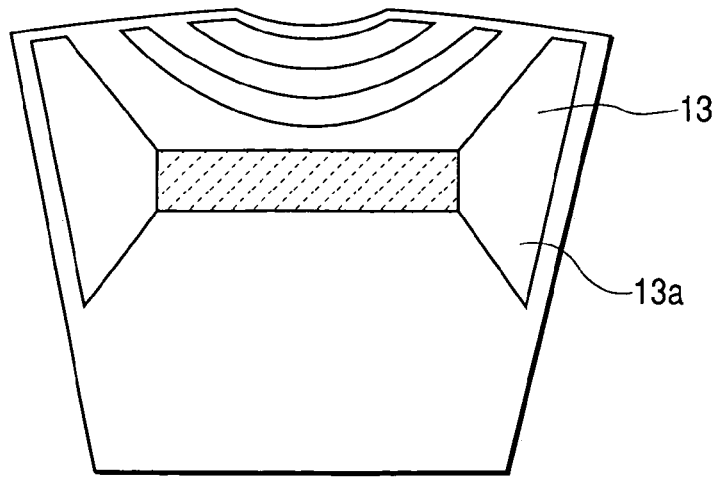
FIG. 7 is a partial cross-sectional view of a rotor, for which corresponding information is expressed in FIGS. 3 and 4, having a third most shallow depth of each trench portion of respective flux barriers.
Figure 8:
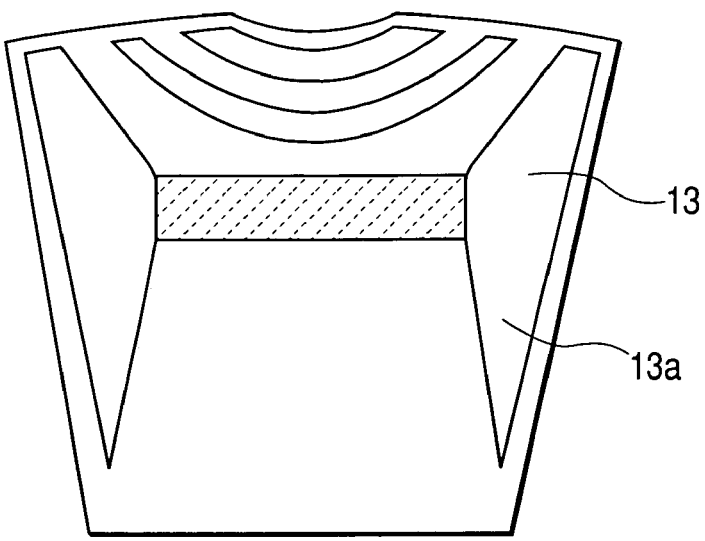
FIG. 8 is a partial cross-sectional view of a rotor, for which corresponding information is expressed in FIGS. 3 and 4, having a greatest depth of each trench portion of respective flux barriers.

If as shown in FIG. 8 the depth d is made excessively large, then in addition to the fact that the d-axis inductance (Ld) and the q-axis inductance (Lq) will each be increased by comparison with the configurations of FIG. 6 or FIG. 7, the strength of the rotor 10 and its capability for withstanding the effects of centrifugal force when rotating at high speed will be degraded.

Conversely, if the depth d of the flux barrier 13 is made shallower than that of the example of FIG. 6, then even if a sufficient degree of reduction of the q-axis inductance (Lq) is achieved, the degree of reduction of the d-axis inductance (Ld) may be insufficient, so that the level of output power that is produced under high-speed operation of the rotary electric machine will be lower than for the case of the depth d being as illustrated in FIG. 6 or FIG. 7.

Hence, to achieve a satisfactory compromise between the requirement for achieving sufficient strength of the rotor and sufficient capability for the rotor to withstand the effects of centrifugal force when rotating at high speed and the requirement for achieving a high level of output power during high-speed operation of the rotary electric machine, the value of the depth d of the flux barrier 13 should be established as follows.

Designating:

(a) Ld0 as the value of d-axis inductance (Ld) that is obtained when the depth d is zero, and (b) Ldmin as the lowest value of d-axis inductance (Ld) that can be achieved (i.e., by appropriately setting the depth d of the flux barrier 13 as described above), the depth d is preferably selected to be within a range such that the d-axis inductance (Ld) attains a value within a range from {0.5 (Ld0+Ldmin} to Ldmin.

With the above embodiments it is assumed that each permanent magnet of the rotor 10 is of rectangular cross-section, however as described hereinabove it would be equally possible to use permanent magnets having other forms of shape in cross-section, such as that shown in FIG. 9.

It should be noted that, as can be understood from FIG. 9, the aforementioned side face lowest point 16 is the most radially inward position on a side face of the permanent magnet 12 (i.e., farthest position from the circumferential face of the rotor core 10 that is disposed opposite the stator) and is not necessarily the most radially inward position on the permanent magnet 12.

Figure 10:
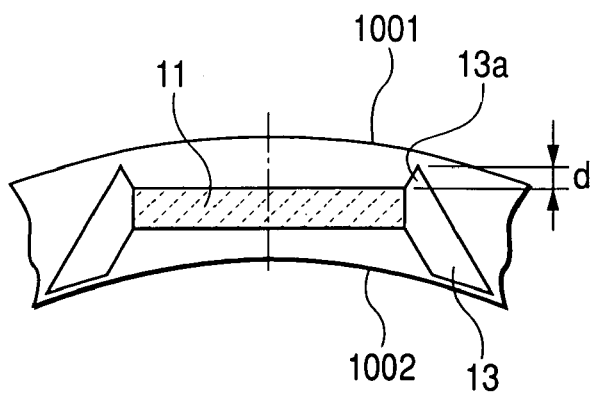
FIG. 10 is a partial cross-sectional view of an example of a rotor of an external-rotor type of IPM rotary electric machine.

Although the invention has been described above for application to an inner rotor type of rotary electric machine, it is equally applicable to an outer rotor type of rotary electric machine. This is illustrated in the partial cross-sectional view of the rotor of an outer rotor type of rotary electric machine, shown in FIG. 10. In this case, each flux barrier such as the flux barrier 13, disposed adjacent each of opposing sides of each permanent magnet 11, extends to a position close to an inner circumferential face 1002 of a cylindrical rotor 1001, with that circumferential face 1002 being disposed opposite the stator of the rotary electric machine. If terms such as "radially inward" used in describing the first embodiment are understood as corresponding to "radially outward" in the case of an outer rotor type of rotary electric machine (in each case signifying a direction away from the rotor circumferential face that is disposed opposite the stator), then it can be seen that the description of the trench portion 13a of the embodiment of FIG. 1 is equally applicable to a flux barrier 13 of the rotor 1001. Moreover in this case, the side face lowest point 16 of the flux barrier 13 is the most radially outward position on a side face of the permanent magnet 12. However, in the same way as for the embodiment of FIG. 1, the side face deepest edge 16 of the embodiment of FIG. 10 is at the farthest position (on the corresponding side face of the magnet accommodation cavity 11) from the circumferential face of the rotor core 10 that is disposed opposite the stator.

Figure 11:
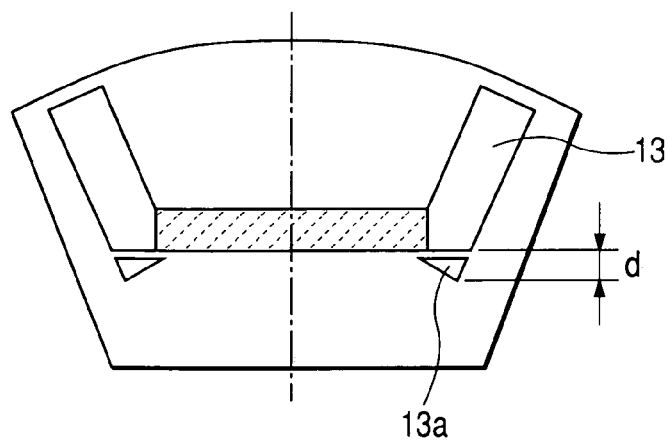
FIG. 11 is a partial cross-sectional view of an embodiment of a rotor of an IPM rotary electric machine according to the present invention, in which each of respective trench portions is disposed separate from and adjacent to a corresponding flux barrier.

Moreover as shown in FIG. 11, it would be equally possible to form the trench portion 13a as a cavity that is partly or entirely separated from the corresponding flux barrier 13, with each lower trench portion 13a being separated from the corresponding flux barrier 13 by a portion of the rotor core 10 that forms a complete or partial partition.

In that case, in order to ensure effective operation of each flux barrier 13, it is necessary to ensure that each partition between the flux barrier 13 and the corresponding trench portion 13a is as thin as possible.

In the above description it has been assumed that each lower trench portion such as the trench portion 13a is of triangular cross-section. However it would be equally possible to utilize a polygonal shape, or a rounded shape that approximates to a triangular shape.

Figure 12:
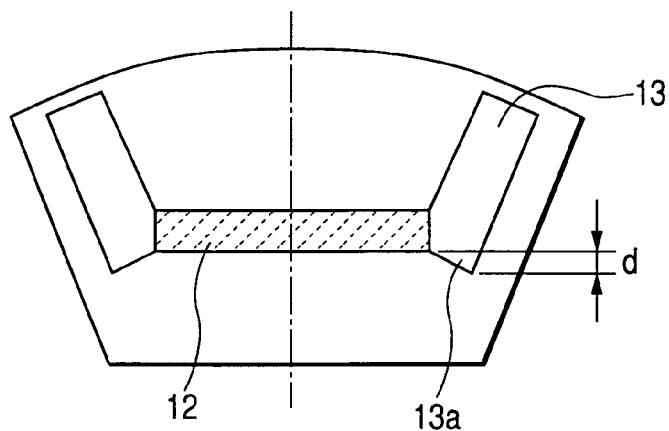
FIG. 12 is a partial cross-sectional view of a rotor, showing an alternative configuration of each of circumferentially opposing flux barriers in which a trench portion is formed.

Alternatively, the trench portion 13a could be constituted by forming the combination of the flux barrier 13 and trench portion 13a to have a substantially rectangular shape, as illustrated by the example shown in FIG. 12. However it is preferable to utilize a triangular cross-section, as for the trench portion 13a of FIG. 1. It has been found that this enables a suitably lowered level of q-axis inductance (Lq) to be achieved, i.e., an increased flow of q-axis magnetic flux can be achieved.

The relationship between output power during high-speed operation of the rotary electric machine (assumed to operate as an electrical generator) and the d-axis magnetic flux will be described in the following.

Equation 1:
$$I = \frac{E_0 - V\cos\delta}{\overline{\omega}L_d \sin\beta - r_a \cos\beta}$$

Equation 2:
$$\beta = \tan^{-1}\left\{\frac{\overline{\omega}L_q(E_0 - V\cos\delta) + r_a V \sin\delta}{\overline{\omega}L_d V \sin\delta - r_a(E_o - V\cos\delta)}\right\}$$

The variables in the above equations 1 and 2 have the following significances:

$E_o$ no-load induced voltage $(E_o = (\sqrt{2}/2)k_w N \phi_p \omega)$

V: MG terminal voltage
$r_a$ armature resistance
ω: rotational speed
L: combined inductance
Ld, Lq: d-axis inductance, q-axis inductance
I: armature current
ψ: power factor angle
β: current phase
δ: load angle Equation 1 above expresses the relationship between the d-axis inductance (Ld) and the output power (more specifically, current) during high-speed operation, while equation 2 defines the current phase angle β which appears in equation 1.

In the above, N is the number of turns per pole of the armature winding, φ is the amount (Wb) of magnetic flux per phase, Kw is the winding coefficient, and p is the number of poles of the rotary electric machine.

Designating a maximum current value Isat as the output current from the electrical generator when operating under a high speed of rotation with saturation of the output current occurring (i.e., a condition in which the output voltage is substantially constant, so that the output power can be considered to be in a saturated condition), then the value of the maximum current Isat can be obtained from the following equation 3 by setting a value of infinity for ω in equation 1 above. In addition, designating βsat as being the value of the current phase angle β in the saturation condition, the value of βsat is obtained from the following equation 4, by inserting a value of infinity for ω in equation 1 above.

Equation 3:
$$Isat = \frac{\sqrt{2}k_w N\phi p}{2L_d \sin\beta}$$

$\beta_{rat} = \pi/2$      Equation 4:

In addition, by inserting the value obtained from equation 4 into equation 3, the following equation 5 is obtained, which provides the value for the maximum current value Isat.

Equation 5:
$$Isat = \frac{\sqrt{2}k_w N\phi p}{2L_d}$$

Thus the generated output power, when operating at a high speed of rotation, in the saturated region, varies in proportion to the flux amount φ, and varies in inverse proportion to the d-axis inductance (Ld). The relationship between the d-axis inductance (Ld) and the depth d of the trench portion 13a has been described hereinabove. If for example as illustrated in FIG. 8 the depth d is made excessively large, then the magnetic flux amount φ is reduced.

The flow of the q-axis magnetic flux within the rotor of the embodiment of FIG. 1, specifically that part of the q-axis magnetic flux which flows along the aforementioned path 19 located radially inward from the magnet accommodation cavity 11 (i.e., farther from the aforementioned rotor circumferential face then the inner face 11a of the magnet accommodation cavity 11) will be further described in the following, referring again to FIG. 13. As can be understood from FIG. 13, if the depth d of the trench portion 13a is made excessively large, then the q-axis magnetic flux that flows from the stator into a path between the flux barrier 13 and a clockwise-adjacent flux barrier 23 (not shown in the drawings) will then be caused to flow within the rotor core 10 radially inward from the lower face of the magnet accommodation cavity 11, along a path that becomes substantially distant from the circumferential face 8 of the rotor core 10, before flowing back to that circumferential face 6 through a path between the flux barrier 23 and an anticlockwise-adjacent flux barrier 13 (not shown in the drawings).

In that case, due to the fact that the q-axis magnetic flux must flow along such a long magnetic circuit path, the magnetic resistance of that path is increased, thereby resulting in a lowering of the output torque (when the rotary electric machine is a motor) or reduction of generated output power (when the rotary electric machine is a generator). In addition, the increased length of the magnetic circuit path 19 makes the magnetic circuit more liable to saturation, so that saturation of output torque or output power will more rapidly occur.

Furthermore even if the depth d is not excessive, but the aforementioned outer sloping face of the flux barrier 13 is formed with the same degree of inclination as the corresponding outer face 13b of the flux barrier 13, as in the example of FIG. 7, then the length of the magnetic circuit path 19 will be made greater than for the case in which the outer sloping face of the flux barrier 13 is formed such as to slope towards the center of the permanent magnet 12, as in the example of FIG. 1 or FIG. 6.

From the above considerations, it can be understood that the configuration of FIG. 1 or FIG. 6 is preferable to that of FIG. 7. That is to say, it is preferable that the deepest point 18 of the trench portion 13a as defined hereinabove should be circumferentially displaced towards the permanent magnet 12, in relation to the side face 13b of the flux barrier 13, i.e., the outer sloping face of the trench portion 13a should incline towards the permanent magnet 12. As a result, as illustrated by the series of arrows 19a in FIG. 13, the q-axis magnetic flux that passes from the rotor circumferential face 8 into a path extending between the flux barrier 13 and an adjacent flux barrier 23 (not shown in the drawings) will then flow along a relatively short path below the radially inward face of the permanent magnet 12, before flowing back to the circumferential face of the rotor core 10. Thus, the part of the q-axis magnetic flux that passes below the permanent magnet 12 will flow along a substantially shorter path within the rotor core 10 than occurs for the case of the configuration shown in FIG. 7.

In that case, due to the shorter magnetic path, an increased value of output torque or output power can be achieved before saturation begins to occur.

To fully achieve the above effects, the outer sloping face of the triangular cross-section of the 13*a* should be longer than the inner sloping face of that cross-section. If this is done, an optimum degree of reduction of d-axis inductance (Ld) (by setting an appropriate value of depth d, as described above referring to FIG. 3) can be achieved.

However if the inner sloping face is made excessively short by comparison with the outer sloping face, then the depth d of the deepest point 18 of the trench portion 13*a* will become excessively small and the desired reduction of the d-axis inductance (Ld) will not be sufficiently achieved. Hence, the ratio of the length of the outer sloping face of the trench portion 13*a* to its inner sloping face should be within a specific range of appropriate values. Preferably, that ratio is in a range of values from 1 to 2. That is to say, in terms of the aforementioned apexes and base line of the triangular cross-section of the trench portion 13*a*, the ratio of the distance between the second and third apexes to the distance between the first and second apexes should be within the above range.

In addition, the trench portion 13*a* is preferably shaped such that the ratio of the distance of the second apex (i.e., corresponding to the deepest point of the trench portion 13*a*) from the base line of the triangle to the length of that base line is within a range of values from 0.3 to 0.8.

It should be noted that it is not essential that the outer sloping face and the inner sloping face of the trench portion 13*a* must each be linear in cross-section, and either or both of these could be of curved cross-section, as in the example of FIG. 6. In that case the ratio of the distance between the side intersection point 17 and the deepest point 18 to the distance between the side face deepest edge 16 and the deepest point 18 should be within the aforementioned range of appropriate values for the outer sloping face and inner sloping face.

It should further be noted that it would be possible to form the cross-sectional shape of each of the outer sloping face and inner sloping face of the trench portion 13*a* as a plurality of connected straight-line sections, so that the cross-section of the trench portion 13*a* will be polygonal. In that case too, the ratio of the distance between the side intersection point 17 and the deepest point 18 to the distance between the side face deepest edge 16 and the deepest point 18 should be within the aforementioned range of appropriate values.

With the above embodiments, a cut-out portion 15 is provided on the rotor core 10 in addition to each set of slits 14, 15, however this is not essential to the present invention.

Furthermore as noted above, it would be equally possible to form the flux barrier 13 and the trench portion 13*a* as respectively separate cavities, separated by a portion of the rotor core 10 serving as a partition, as illustrated in the example of FIG. 11, or to form the flux barrier 13 and the trench portion 13*a* as partially separate cavities, i.e., which communicate through a partial partition.

As noted hereinabove, each description given concerning a flux barrier 13 of an embodiment is to be understood as applying equally to each flux barrier 23 of the embodiment.

What is claimed is:

1. An internal permanent magnet (IPM) rotary electric machine having a rotor with a rotor core formed with a plurality of magnet accommodation cavities disposed successively circumferentially with a fixed pitch and with a plurality of permanent magnets contained with respective ones of said magnet accommodation cavities, each said magnet accommodation cavity having circumferentially opposing faces respectively extending parallel to an axial direction of said rotor, and each said magnet accommodation cavity being located inward from a circumferential face of said rotor core that is disposed opposite a stator of said rotary electric machine, said circumferential face being disposed opposite a stator core of said rotary electric machine, the rotor core further formed with a plurality of flux barriers for blocking circumferentially-directed flows of magnetic flux of said permanent magnets, with a pair of said flux barriers disposed extending out of, or closely adjacent to, respective circumferentially opposing ends of each said magnet accommodation cavity, each said flux barrier extending radially to a position close to said circumferential face of said rotor core;

wherein each said flux barrier is formed with a trench portion which extends to a deepest point within said rotor core, said deepest point being located at a greater radial distance from said circumferential face than a radial distance from said circumferential face to a deepest edge of a side face of said permanent magnet; said deepest edge being a location, on said permanent magnet side face, that is at a maximum radial distance from said circumferential face, wherein said each flux barrier is shaped substantially as a triangle, as seen in a cross-section taken in a plane at right angles to said rotor axis direction, said triangle having a first apex, corresponding to said deepest edge, a second apex, corresponding to said deepest point of said trench portion, and a third apex, corresponding to a point of intersection between an outer side face of said flux barrier and a tangent line that extends from said deepest edge and is tangent to an imaginary circle that is centered on a central axis of said rotor and has a radius equal to the distance from said central axis to said deepest edge.

2. An IPM rotary electric machine according to claim 1, wherein:

designating Ld0 as the value of d-axis inductance (Ld) of said rotor that is obtained when a difference between said respective distances of said deepest point of said trench portion and said deepest edge of said side face of said permanent magnet from said circumferential face of said rotor is zero, and designating Ldim as a value of said difference between said respective distances whereby a minimum value of said d-axis inductance (Ld) is obtained, said difference between said respective distances is established such that said d-axis inductance (Ld) attains a value within a range from $\{0.5(Ld0+Ldmin)\}$ to Ldmin.

3. An IPM rotary electric machine according to claim 2, wherein in said substantially triangular cross-section of said flux barrier, a straight line extending between said second apex and said third apex is longer than a straight line constituting a base line of said triangle, extending between said second apex and said first apex, whereby a deepest point of said trench portion is located circumferentially closer to said magnet accommodation cavity than said point of intersection between said outer side face of said flux barrier and said tangent line.

4. An IPM rotary electric machine according to claim 2, wherein a ratio of a distance between said second apex and said-third apex to a distance between said second apex and said first apex has a value within a range from 1 to 2.

5. An IPM rotary electric machine according to claim 2, wherein a ratio of the length of a line extending at right angles from said second apex to the length of said base line is within a range of 0.3 to 0.8.

6. An IPM rotary electric machine according to claim 1, wherein said trench portion of said each flux barrier comprises a cavity which is disposed closely adjacent to said flux barrier, separated therefrom by a partition that is constituted by a part of said rotor core.

7. An IPM rotary electric machine according to claim 1, wherein said trench portion of said each flux barrier comprises a cavity which is disposed closely adjacent to said flux barrier, communicating with but partially separated therefrom by a partial partition that is constituted by a part of said rotor core.

* * * * *